(12) United States Patent
Johnson et al.

(10) Patent No.: US 7,247,805 B2
(45) Date of Patent: Jul. 24, 2007

(54) SWITCH ACTUATION METHOD AND MECHANISM

(75) Inventors: Duane R. Johnson, Wellington, OH (US); Jeffrey Krause, Wellington, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 86 days.

(21) Appl. No.: 11/201,001

(22) Filed: Aug. 10, 2005

(65) Prior Publication Data

US 2007/0034492 A1 Feb. 15, 2007

(51) Int. Cl.
*H01H 9/00* (2006.01)

(52) U.S. Cl. .................... 200/61.54; 200/337

(58) Field of Classification Search ............ 200/61.54, 200/335, 61.89, 331, 337, 338, 342, 33 B–33 D, 200/47, 52 R, 61.39, 61.42, 500, 501
See application file for complete search history.

(56) References Cited

U.S. PATENT DOCUMENTS

| | | | |
|---|---|---|---|
| 4,305,355 A | 12/1981 | Jordan | |
| 4,331,418 A | 5/1982 | Klebe | |
| 4,361,743 A | 11/1982 | Ayers | |
| 4,404,439 A * | 9/1983 | Leighton | 200/61.89 |
| 4,437,213 A | 3/1984 | Reese et al. | |
| 4,438,302 A | 3/1984 | Hruda | |
| 4,463,231 A | 7/1984 | Cooper et al. | |
| 4,463,524 A | 8/1984 | Schott et al. | |
| 4,591,824 A | 5/1986 | Lomen | |
| 4,593,163 A | 6/1986 | Fisher | |
| 4,604,506 A | 8/1986 | Gebhardt | |
| 4,664,364 A | 5/1987 | Lymburner | |
| 4,686,339 A | 8/1987 | Sapone | |
| 4,716,326 A | 12/1987 | Fisher | |
| 4,845,803 A | 7/1989 | King | |
| 4,853,502 A | 8/1989 | Canipe | |
| 4,899,673 A | 2/1990 | Takahashi et al. | |
| 4,964,678 A | 10/1990 | Holloway et al. | |
| 4,978,177 A | 12/1990 | Ingraham et al. | |
| 4,990,886 A | 2/1991 | Stanulis | |
| 4,990,887 A | 2/1991 | Lee | |
| 5,002,166 A | 3/1991 | Leigh-Monstevens et al. | |
| 5,028,851 A | 7/1991 | Wilder | |
| 5,031,737 A | 7/1991 | Dzioba et al. | |
| 5,059,947 A | 10/1991 | Chen | |
| 5,162,625 A | 11/1992 | Comerford | |
| 5,241,144 A | 8/1993 | Meagher et al. | |
| 5,249,933 A | 10/1993 | Moody | |
| 5,272,291 A | 12/1993 | Erickson | |
| 5,304,759 A | 4/1994 | Doherty | |
| 5,321,219 A | 6/1994 | Meagher et al. | |
| 5,527,005 A | 6/1996 | Wydotis | |
| 5,534,672 A | 7/1996 | Meagher | |

(Continued)

*Primary Examiner*—Kyung S. Lee
*Assistant Examiner*—Lisa Klaus
(74) *Attorney, Agent, or Firm*—Calfee Halter & Griswold LLP

(57) ABSTRACT

A mechanism is provided for actuating a switch that transmits motion from a first component, which moves along a first path, to a system that is attached to the mechanism. The mechanism includes a second component that moves transverse to the first path and a third component having a switch actuating portion, wherein movement of the first component causes the third component to actuate the switch using motion that is generally along the first path.

30 Claims, 5 Drawing Sheets

U.S. PATENT DOCUMENTS

| | | | |
|---|---|---|---|
| 5,590,857 A | 1/1997 | Albrecht et al. | |
| 5,628,477 A | 5/1997 | Caferro et al. | |
| 5,670,761 A | 9/1997 | Ryan et al. | |
| 5,793,316 A * | 8/1998 | Noguchi et al. | 341/77 |
| 5,801,624 A | 9/1998 | Tilly et al. | |
| 5,813,944 A * | 9/1998 | Grindle | 477/209 |
| 5,907,990 A * | 6/1999 | Satoh | 91/369.2 |
| 5,929,407 A | 7/1999 | Ziem | |
| 6,101,896 A | 8/2000 | Engelgau | |
| 6,212,460 B1 | 4/2001 | Rizzo et al. | |
| 6,217,329 B1 | 4/2001 | Eibofner et al. | |
| 6,325,469 B1 | 12/2001 | Carson et al. | |
| 6,367,349 B1 * | 4/2002 | Allen et al. | 74/512 |
| 6,373,009 B1 | 4/2002 | Prohaska et al. | |
| 6,439,675 B1 | 8/2002 | Zechmann et al. | |
| 6,531,667 B2 | 3/2003 | Becker et al. | |
| 6,628,197 B1 | 9/2003 | Poguntke et al. | |
| 6,634,275 B2 * | 10/2003 | Yamaga et al. | 91/367 |
| 6,679,569 B2 | 1/2004 | Schmidt et al. | |
| 6,706,988 B1 | 3/2004 | Helf et al. | |
| 6,757,115 B2 * | 6/2004 | Kondo et al. | 360/15 |
| 6,880,427 B2 * | 4/2005 | Allen et al. | 74/512 |
| 2002/0008424 A1 | 1/2002 | Kanazawa et al. | |
| 2002/0022919 A1 | 2/2002 | Hara et al. | |
| 2002/0033323 A1 * | 3/2002 | Ehrensberger | 200/302.2 |
| 2002/0056625 A1 | 5/2002 | Becker et al. | |
| 2003/0130783 A1 | 7/2003 | Hellmann et al. | |
| 2004/0144194 A1 * | 7/2004 | Allen et al. | 74/512 |

* cited by examiner

SWITCH ACTUATION METHOD AND MECHANISM

BACKGROUND OF INVENTION

The present invention relates to a mechanism for actuating a switch and transmitting force or motion to a system component. It finds particular application in conjunction with actuating a lost motion switch and transmitting force or motion to a system component while allowing angular articulation of at least one component of the mechanism and will be described with reference thereto. It will be appreciated, however, that the invention is also amendable to other applications.

As is known in the art, many types of systems utilize a mechanism, linkage, or the like to transmit motion and/or force to or from the system. In some systems, it is desirable to initially actuate a switch prior to transmitting the force or motion. For example, in passenger cars and heavy vehicles, the brake lights and cruise control cutoff are actuated by a very small amount of initial brake pedal travel, which is typically solely designed to actuate the switch. The switches used for these applications are termed "lost motion" switches.

FIG. 1 illustrates a known design for a lost motion switch 10. The switch 10 includes a body 12 which houses electrical contacts (not shown) and has an integral electrical connector 14. The switch 10 also includes a plunger 16 that extends from the body 12. When the plunger 16 is depressed into the body 12, typically against the bias of an internal spring (not shown), the electrical contact of the switch 10 change from a first state to a second state, such as for example from a closed state to open state or vice versa. The plunger 16 is located between two mounting ears 18a, 18b. Each ear 18a, 18b, includes an opening 20a, 20b for mounting the switch 10.

FIGS. 2 and 3A–B illustrate a known mechanism 22 for actuating a lost motion switch 10 in a vehicle brake application. In addition to actuating the lost motion switch 10, the mechanism transmits motion from a brake pedal arm 24 to the brake system. The switch 10 typically mounts onto a pin 26 via the openings 20a, 20b in the ears 18a, 18b (see FIG. 1). The pin 26 also mounts to the pedal arm 24 and through an opening 28 in a connecting member 30, such as for example a yoke or pushrod. The mechanism 22 is designed such that movement of the pedal arm 24 results in movement of the yoke 30. Movement of the yoke 30 actuates the brake system component (not shown), such as a brake valve, in an air-braked vehicle or a master cylinder, or a hydraulic brake booster, such as for example a Hydroboost® or Hydromax®, in a hydraulically braked vehicle.

The lost motion switch 10 is positioned to straddle the yoke 30. The yoke 30 includes a nose portion 32 which mates with and depresses the lost motion switch plunger 16 during brake pedal actuation. This occurs because the pin 26 is sized to fit snugly through the openings 20a, 20b in the mounting ears 18a, 18b (see FIG. 1) while having clearance in the opening 28 in the yoke 30. In particular, as the pedal arm 24 moves in response to a user depressing the brake pedal (not shown), the pin 26 is forced from one side of the opening 28 in the yoke to the other side (see FIGS. 3A–3B). This results in the nose 32 depressing the switch plunger 16 and actuating the switch 10. As the pedal arm 24 continues to travel, the pin 26 engages the opposite side of the opening 28 and motion of the pedal arm is then transmitted through the braking system.

In some applications, however, the known mechanism of FIGS. 1–3 is ineffective. For example, the brake systems of low cab forward/low front entry vehicles have space constraints that may require motion from the pedal arm 24 to be redirected transverse to the direction movement of the arm. As a result, the yoke 30 may have side-to-side motion relative to the pedal arm 24 and lost motion switch 10. Lost motion switches, however, are designed for and best suited to operate when the components of the mechanism all move along a single direction or single/parallel plane(s). In these applications, motion of the yoke 30 that is transverse to the motion of the switch can cause the switch to be less reliable and fail prematurely.

SUMMARY OF INVENTION

A mechanism is provided for actuating a switch that transmits motion from a first component, which moves along a first path, to a system that is attached to the mechanism. The mechanism includes a second component that moves transverse to the first path and a third component having a switch actuating portion, wherein movement of the first component causes the third component to actuate the switch using motion that is generally along the first path.

BRIEF DESCRIPTION OF DRAWINGS

In the accompanying drawings which are incorporated in and constitute a part of the specification, embodiments of the invention are illustrated, which together with a general description of the invention given above, and the detailed description given below, serve to exemplify the embodiments of this invention, wherein.

DETAILED DESCRIPTION OF DRAWINGS

The present invention relates to a mechanism for actuating a switch and transmitting force and/or motion to a system component. In particular, the present invention relates to a mechanism that allows reliable use of a switch while allowing angular articulation of at least one component of the mechanism. FIGS. 4–7 illustrate a mechanism 50 for actuating a lost motion switch 10'. For ease of understanding this embodiment, like components are designated by like numerals with a primed (') suffix and new components are designated by new numerals. In the embodiment of FIGS. 4–7, the mechanism 50 is part of a vehicle brake system and the lost motion switch 10' is used to control the brake lights of the vehicle and/or the cruise control cut-off. It should be readily apparent, however, that the mechanism according to the present invention could be applied to systems other that vehicle brake systems. For example, the mechanism can be applied to systems which utilize lost motion to actuate a switch and find benefit in interfacing the switch with motion that is generally along the same path as the motion of switch plunger or the force receiving component of the mechanism.

Further, as applied to a vehicle brake system, the components or members of the mechanism 50 are described as having a particular shape and size which is suitable for, though not necessarily required for, use in a vehicle brake system. It should be readily apparent, however, that the mechanism can utilize components or members that vary in shape and size from those illustrated in FIGS. 4–7 and still function as intended and described according to the present invention.

As used herein, when two or more components are described as being coupled, engaged, or attached, it is applicants' intention to include both direct coupling, engagement, and/or attachment between the described components and indirect coupling, engagement, and/or attachment between the described components such as through one or more intermediary components.

The mechanism 50 actuates a lost motion switch 10' that may be similar to the known switch 10 described above. In particular, the switch 10' includes a body 12' and a plunger 16' that when depressed changes the switch from a first state to a second state, such as for example changing an electrical contact from an open state to a closed state or vice versa. The plunger 16' is generally positioned between two mounting ears 18a' and 18b', each of which include an opening 20a', 20b' for mounting the switch 10'. One of ordinary skill in the art will readily appreciate that alternative designs for the lost motion switch may be used with the present invention.

Figure 4:
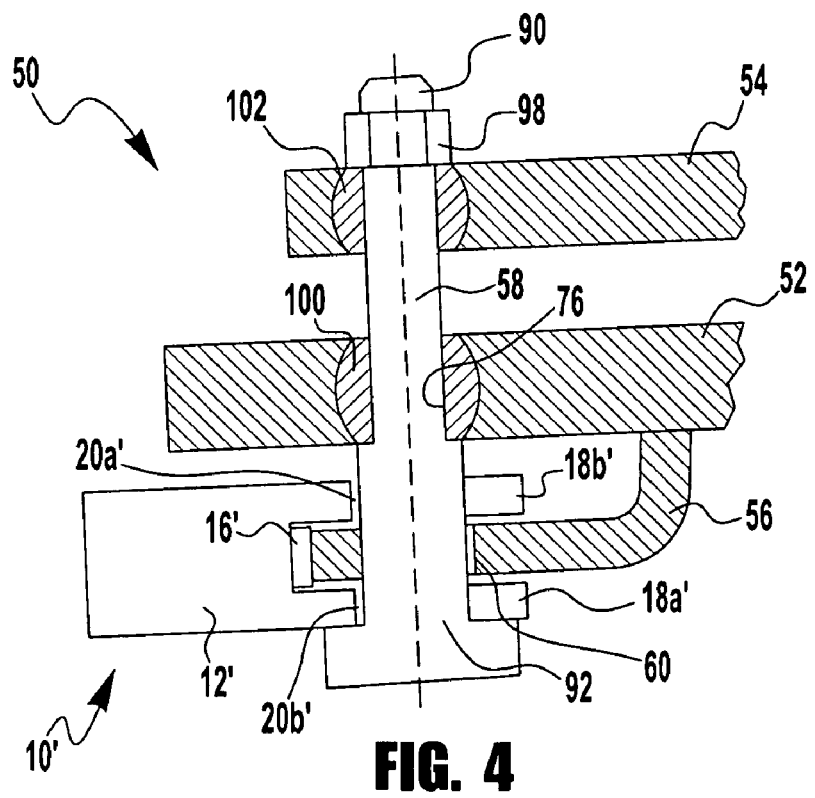
FIG. 4 is a cross-sectional top view of a first exemplary mechanism according to the present invention, illustrated in a first position.

With reference to FIG. 4, the mechanism 50 includes a first component 52 realized in the form of a pedal arm, a second component 54 realized in the form of a connecting member, a third component 56 realized in the form of a fixed member, and a fourth component 58 realized in the form of a pin. The fixed member 56 attaches to and extends from the pedal arm 52 to a position generally adjacent the plunger 16' of the lost motion switch 10'. The lost motion switch 10' mounts onto the pin 58 and the pin pivotably engages both the pedal arm 52 and the connecting link 54. The pin 58 is received through an opening 60 in the fixed member 56 with sufficient clearance to allow the pin to shift within the opening in response to initial movement of the pedal arm 52. The movement of the pin 58 within the opening 60 changes the relative position between the switch 10' and the fixed member 56. The change in relative position results in the fixed member 56 depressing the plunger 16 and actuating the switch 10'.

Figures 5, 5A:
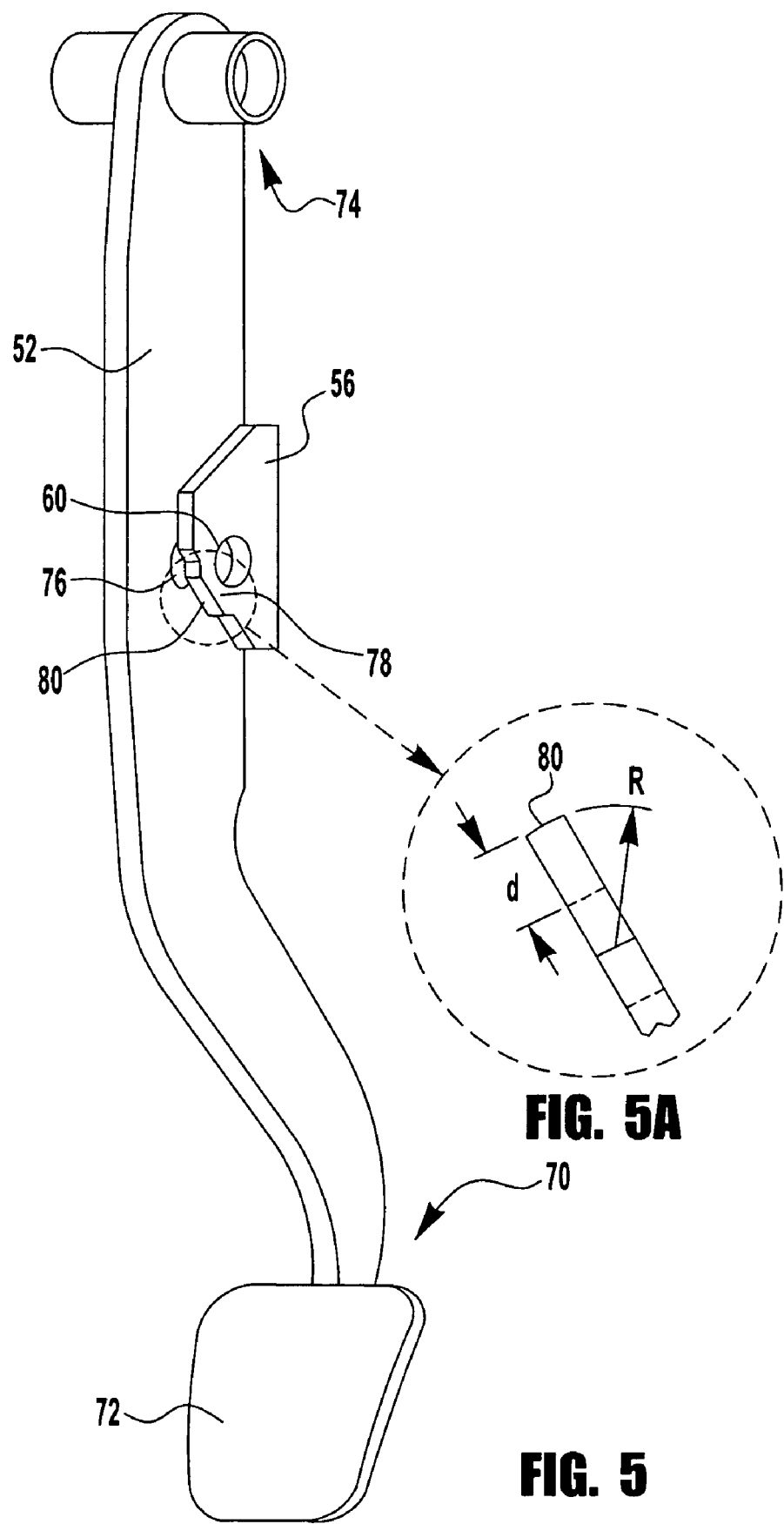
FIG. 5 is a perspective view a pedal arm and fixed member of the exemplary mechanism of FIG. 4.
FIG. 5A is an enlarged side view of the nose portion of the fixed member of the exemplary mechanism of FIG. 4.

As shown in FIG. 5, the pedal arm 52 is an elongated member with a first end portion 70 on which the brake pedal 72 is mounted and a second end portion 74 designed to be pivotably attached to a fixed point (not shown), such as for example onto a fixed portion of a vehicle. Thus, when the user applies force to the pedal arm 52, such as for example by pressing on the brake pedal 72, the pedal arm pivots about the second end portion 74 moving in a first direction D along a plane or path. The pedal arm 52 may further include an opening 76 to facilitate connecting with the pin 58.

The fixed member 56 extends outward from the pedal arm 52 and toward the position of the switch 10. The fixed member 56 can be integral with the pedal arm 52 or can be attached in a manner allowing it to move with the pedal arm, such as for example by adhesives, fasteners, welding, or other means.

The opening 60 of the fixed member 56 is generally positioned adjacent the opening 76 in the pedal arm 52 such that both openings 60, 76 receive the pin 58. The fixed member 56 also includes a nose portion 78 designed to engage the lost motion switch plunger 16'. As shown in FIG. 5A, the nose portion 78 may include a face 80 with a radial profile, such as for example about a one-inch radius. The radius R on the face 80 of the nose portion 78 helps reduce wear and assists in maintaining uniform contact between the nose portion 78 with the lost motion switch plunger 16. The face 80 of the nose portion 78, however, is not required to be radial.

Figure 6:
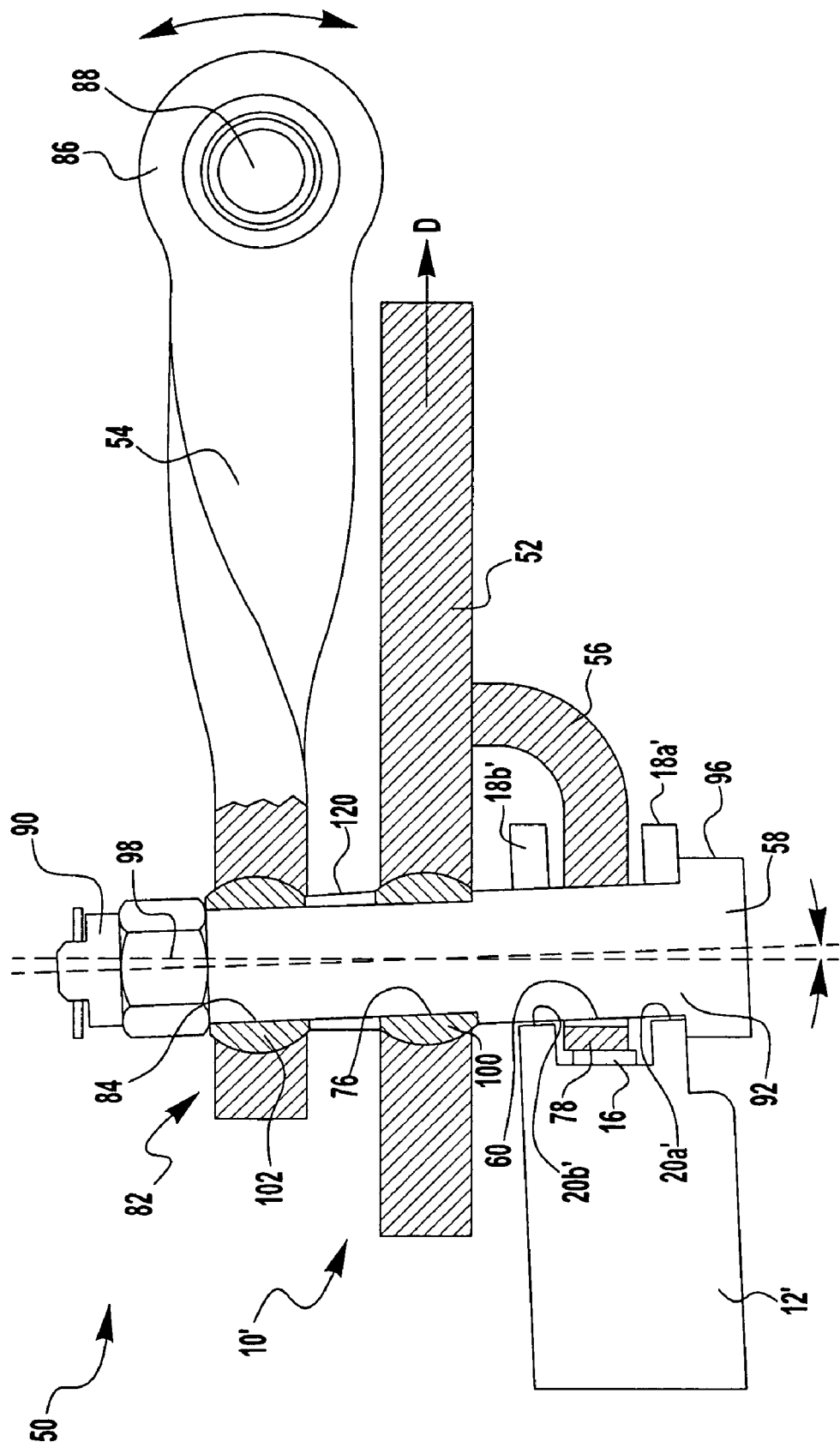
FIG. 6 is a cross-sectional top view of the exemplary mechanism of FIG. 4, illustrated in a second position.

The connecting member 54 is an elongated member with a first end portion 82 adapted to connect with the pin 58. For example, the first end portion 82 may have an opening 84 to facilitate connecting to the pin 58. FIG. 6 illustrates an embodiment of the connecting member 54 in which the member includes a second end portion 86 with a second opening 88 for connecting to a brake system component. The connecting member 54 includes a twist along its length such that the axes of the first and second openings 84, 88 are transverse.

The pin 58 is a generally elongated member designed to connect and pivotably engage the pedal arm 52 and connecting member 54. The pin 58 includes a first end portion 90 and a second end portion 92. As illustrated in FIG. 4, the pin 58 may include a means for retaining the pin in position relative to the other mechanism components. Examples of means for retaining the pin in position include an enlarged head portion 96, a fastener such as for example a nut 98 threaded onto an end of the pin, a clip, a cotter pin, retaining pin or other retaining means.

FIG. 4 illustrates the assembled mechanism 50 in a first position in which little or no force is applied to the pedal arm 52. The pin 58 pivotably engages and connects to the pedal arm 52 and connecting member 54 by being received through openings 60, 76. The openings 60, 76 may include spherical bearings 100, 102 to assist the pivotal movement of the pin 58. Alternatively, the pin 58 may engage the pedal arm 52 and connecting member 54 in other ways, such as for example a ball and socket connection or a loose fit between the pin and the openings 60, 76.

The fixed member 56 resides between the ears 18a', 18b' of the lost motion switch 10' such that the nose portion 78 is adjacent the plunger 16'. The pin 58 is received through the mounting openings 20a', 20b' of the lost motion switch 10' and the opening 60 of the fixed member 56. The pin 58 fits snugly in the openings 20a, 20b such that the switch 10' closely follows the motion of the pin. The pin 58, however, has clearance in the opening 60 of the fixed member 56. The opening 60 is sized and positioned such that the clearance to the pin 58 and the distance to the nose 78 helps determine the distance the lost motion switch plunger 16' is depressed. In this manner, over stroking of the plunger 16' can be avoided.

Figure 7:
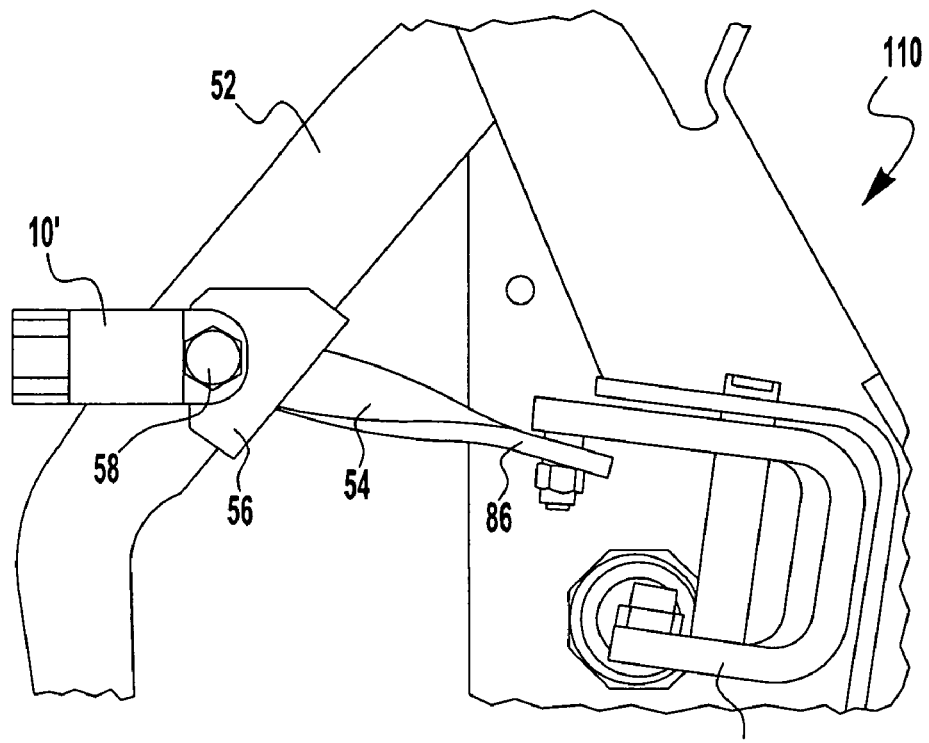
FIG. 7 is a side view of the exemplary mechanism of FIG. 4, used in a vehicle brake application.

FIG. 7 illustrates an embodiment of the assembled mechanism 50 applied to a vehicle brake system 110 for a low cab forward/low front entry vehicle. The brake system 110 (shown partially) includes a bell crank 112 for transmitting and redirecting the force and motion of the pedal arm 52 transverse to the motion of the pedal arm. The use of a bell crank 112, however, results in motion of the second end portion 86 of the connecting member 54 that is transverse or angular to the motion of the pedal arm, as illustrated in FIG. 6.

Figure 1:
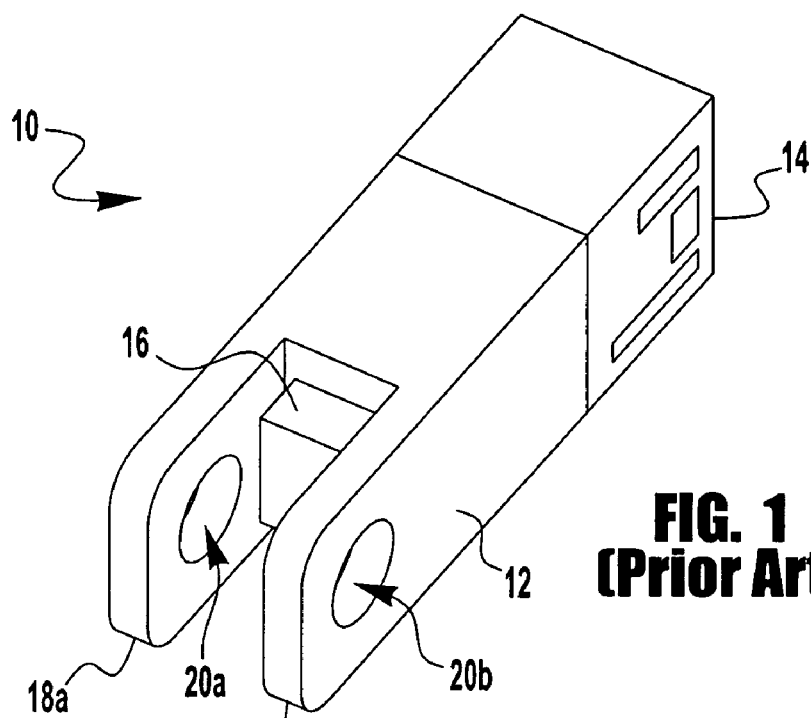
FIG. 1 is a perspective view of a known lost motion sensor.
Figure 3A:
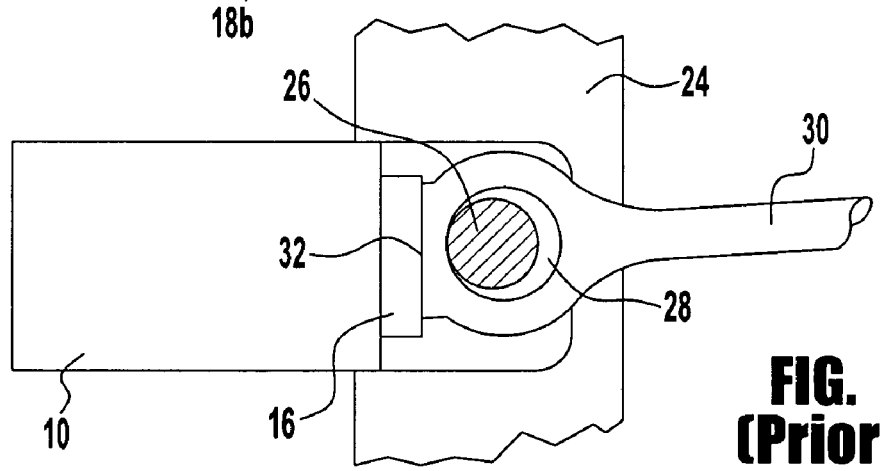
FIG. 3A is a cross-sectional side view of the known mechanism of FIG. 2, illustrated in a first position.
Figure 3B:
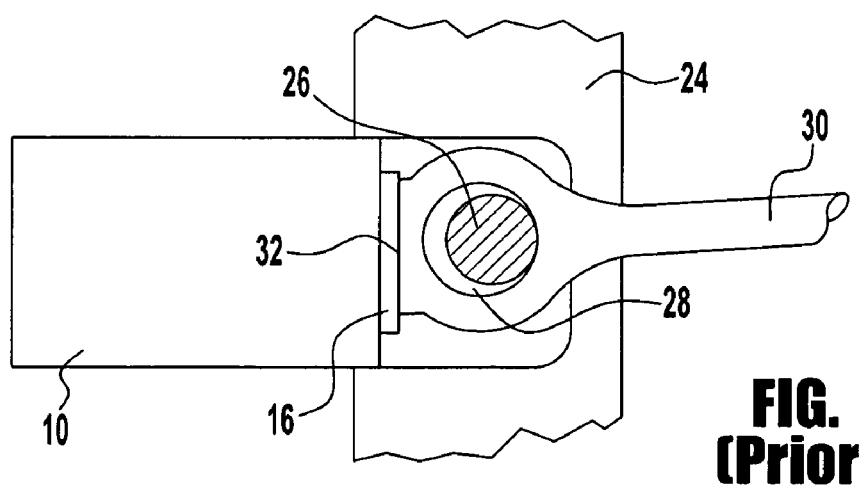
FIG. 3B is a cross-sectional side view of the known mechanism of FIG. 2, illustrated in a second position.
Figure 2:
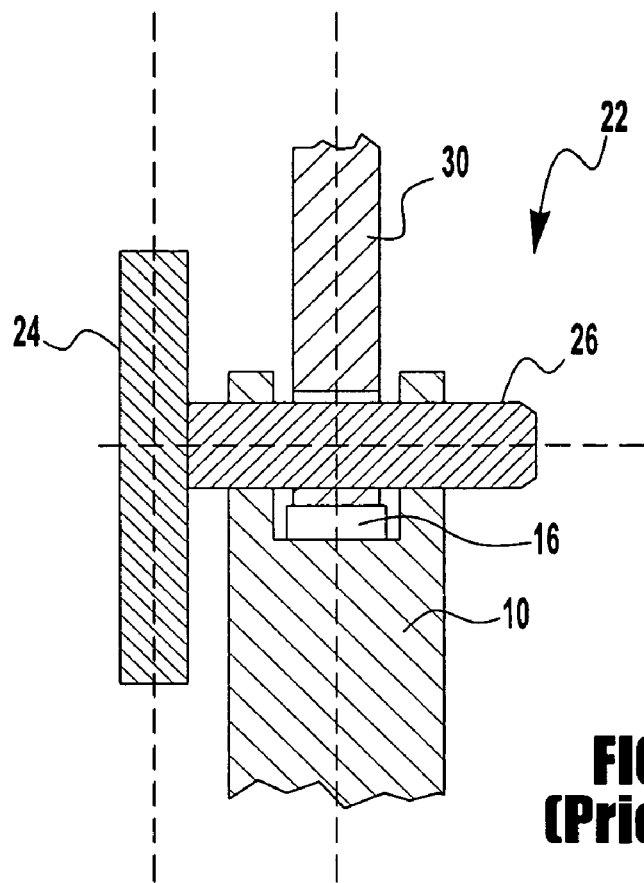
FIG. 2 is a cross-sectional top view of a known mechanism for actuating a lost motion sensor.

In the prior known mechanism 22 design of FIG. 2, the switch 10 is subjected to any transverse motion of the connecting link 30. This transverse motion can cause the plunger 16' to be released or depressed at undesirable moments, making the switch unreliable. Further the side load on the plunger can allow contaminants to enter the switch body resulting in decreased switch life. The mechanism 50 accommodates for this angular movement of the connecting member 54 and interfaces the switch 10' with motion that is generally along the same path or same plane as the motion of the pedal arm 52. In this manner, the transverse motion of the connecting member 52 is generally isolated from the switch 10'.

In particular, in operation, when little or no force is applied to the brake pedal 72, the mechanism 50 is in a first position as shown in FIG. 4. In this position, the pin 58 is toward the left side (as viewed in FIG. 4) of the opening 60 of the fixed member 56 and the plunger 16' is in an extended position. The nose 78 of the fixed member 56 may or may not be in contact with the plunger 16'.

Referring to FIG. 6, when a user depresses the brake pedal 72 (see FIG. 5), the pedal arm 52 moves to the right (as shown in FIG. 6) carrying the pin 58 with it. The connecting member 54 resists movement due to resistance of the system components to which the connecting member links. Thus, the first end portion 90 of the pin 58 does not initially move in the direction of the pedal arm 52 movement D. As a result, the pin 58 pivots within the pedal arm 52 and connecting member 54. The pivotal movement of the pin 58 results in the second end portion 92 of the pin 58 moving from left side of the opening 60 to the right side (as shown in FIG. 6). The change in relative position between the switch 10' and the fixed member 56, results in the nose 78 depressing the plunger 16' and actuating the switch 10' to change the switch from a first state to a second state.

The distance between where the pin's pivot point within the pedal arm 52 and where the pin engages both the connecting member 54 and the fixed member 56 influences the amount of force and travel required to actuate the lost motion switch 10'. Thus, the force and travel can be customized by altering the arrangement of components of the mechanism 50. For example, if the distance between the pin's pivot point and where the pin 58 engages the connecting member 54 is increased, more pedal arm 52 travel and less force will be required to actuate the switch 10'. A spacer 120 may be provided that fixes the distance between the pin's pivot point and where the pin 58 engages another mechanism component, such as for example the connecting member 54. The spacer 120 can be an annular, generally cylindrical piece that fits over the pin and between components of the mechanism (see FIG. 6). The spacer, however, can take a variety of forms.

As the pedal arm 52 continues to move to the right (see FIG. 6), the force on the connecting member 54 becomes sufficient to move the connecting member in the same direction D as the pedal arm. At this point, just prior to movement of the connecting member 54, the mechanism 50 is in a second position in which the pedal arm 52 has moved through the lost motion in the system. As the connecting member 54 begins to move, the mechanism 50 moves from the second position to a third position. The third position merely refers to a position in which the connecting member has transmitted some motion to a system component. For example, the third position may refer to a position in which the brakes are fully applied or a position in which the brakes just begin to apply.

During movement between the second position and the third position, the second end portion 86 of the connecting link 54 can have significant side-to-side movement (transverse or angular to movement of the pedal arm 52). For example, in the system in FIG. 6, the bell crank 112 causes the second end 86 to move side-to-side. The side-to-side movement of the connecting member 54, however, is not transferred back to the plunger 16' because of the pivotal relationship between the pin 58 and the connecting member 54, the pedal arm 52, and fixed member 56.

Figure 8:
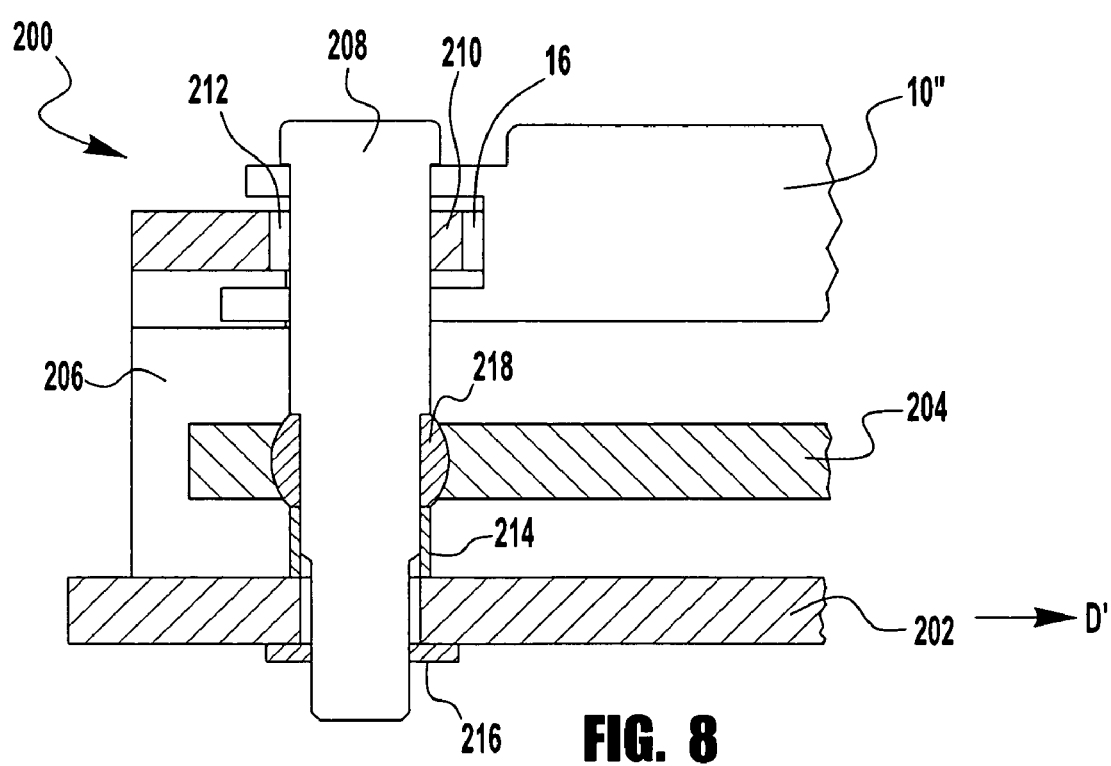
FIG. 8 is a cross-sectional top view of a second exemplary mechanism according to the present invention.

FIG. 8 illustrates another embodiment of an exemplary mechanism according to the present invention. The mechanism 200 is similar to the mechanism 50 of FIGS. 4–7 in that it includes a first component 202 realized in the form of a pedal arm, a second component 204 realized in the form of a connecting member, a third component 206 realized in the form of a fixed member, and a fourth component 208 realized in the form of a pin. The operation of the mechanism 200 is also similar to the mechanism 50. In general, the fixed member 206 extends from the pedal arm 202 and includes a nose portion 210 for engaging the plunger 16 of the lost motion switch 10". The pin 208 pivotably engages the pedal arm 202 and the connecting member 204 such that the initial movement of the pedal arm in the general direction D' pivots the pin. As a result, the pin 208, on which the switch 10" is mounted, changes position relative to the fixed member 206 by shifting within an opening 212 in the fixed member. The change in relative position causes the nose portion 210 to depress the plunger 16 and actuate the switch 10".

The mechanism 200 may also include a spacer 214 similar to spacer 120 of mechanism 50 and a retention means for the pin 208 such as for example a retaining pin 216. Further, as with the mechanism 50, the mechanism 200 may include a spherical bearing 218 at an engagement point between the pin 208 and another component, such as for example the connecting member 204. However, a loose fit as shown between the pin 208 and pedal arm 202 in FIG. 8, or other manner of pivotal connection may also be used.

In the embodiment of FIG. 8, however, the connecting member 204 is positioned between the lost motion switch 10" and the pedal arm 202 as compared to the mechanism 50 of FIGS. 4–7 in which the pedal arm 52 is resides between the switch 10" and the connecting member 54. Further, the fixed member 206 in mechanism 200 has a plate-like configuration that extends below a portion of the connecting member 204 and switch 10" to avoid interference between components during operation of the mechanism.

While the present invention has been illustrated by the description of embodiments thereof, and while the embodiments have been described in considerable detail, it is not the intention of the applicants to restrict or in any way limit the scope of the appended claims to such detail. Additional advantages and modification will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A mechanism for actuating a switch and transmitting motion to a system attached to the mechanism, the mechanism comprising:

a first component movable along a first path;

a second component movable in response to movement of the first component, wherein the second component is movable transverse to the first path;

a third component movable along the first path, the third component having a portion for engaging the switch; and wherein movement of the first component causes the third component to actuate the switch using motion generally along the first path.

2. The mechanism according to claim 1 further comprising a fourth component onto which the switch mounts, the fourth component adapted to pivotably engage the first component and the second component.

3. The mechanism according to claim 2 further comprising a spherical bearing for facilitating the fourth component pivotably engaging at least one of the first component and second component.

4. The mechanism according to claim 2 wherein the third component includes an opening for receiving the fourth component.

5. The mechanism according to claim 1 wherein the transverse motion is generally isolated from the switch.

6. The mechanism according to claim 1 wherein the movement of the first component changes the relative position between the switch and the third component.

7. The mechanism according to claim 1 wherein the third component is attached to the first component.

8. The mechanism according to claim 1 wherein the third component is integral to the first component.

9. The mechanism according to claim 1 wherein the portion for engaging the switch has a radial face.

10. The mechanism according to claim 1 wherein the first component is a brake pedal arm.

11. A mechanism for actuating a switch and transmitting motion to a system component, the mechanism comprising:
a first component movable along a first path between a first position, a second position, and a third position;
a second component movable in response to movement of the first component, wherein the second component engages the system component and is movable angular to the first path;
a third component attached to the first component for movement substantially in the first direction, the third component having a portion for engaging the switch; and
a fourth component on which the switch is mounted, the fourth component connecting the first component, the second component, and the third component,
wherein movement between the first position and the second position actuates the switch and movement between the second position and third position transmits motion to the system component.

12. The mechanism according to claim 11 wherein the fourth component pivotably engages the first component and second component.

13. The mechanism according to claim 12 further comprising a spherical bearing for facilitating the fourth component pivotably engaging at least one of the first component and second component.

14. The mechanism according to claim 11 wherein movement of the first component causes the third component to actuate the switch using motion generally along the first path.

15. The mechanism according to claim 11 wherein the third component is integral to the first component.

16. The mechanism according to claim 11 wherein the portion for engaging the switch has a radial face.

17. The mechanism according to claim 11 wherein the first component is a brake pedal arm.

18. A mechanism for actuating a switch and transmitting motion to a system component, the mechanism comprising:
a pin fixably connected to the switch; and
a force receiving member pivotably connected to a pin, the force receiving member movable along a first path between a first position, a second position, and a third position;
wherein movement of the force receiving member between the first position and second position pivots the pin relative to the force receiving member to change the switch from a first state to a second state, and movement of the force receiving member between the second position and the third position transmits motion to the system component while retaining the switch in the second state.

19. The mechanism according to claim 18 further comprising a connecting member pivotably connected to the pin, the connecting member moving transverse to the first path when the force receiving member moves from the second position to the third position.

20. A mechanism for actuating a switch and transmitting motion to a system component, comprising:
a first component movable along a first path;
a second component attached to the system component, the second component movable transverse to the first path; and
a means for transmitting motion, generally along the first path, to actuate the switch.

21. The mechanism according to claim 20 wherein the means for transmitting motion to actuate the switch includes a pin pivotably engaging the first component and second component.

22. The mechanism according to claim 21 wherein the switch is fixably mounted to the pin.

23. The mechanism according to claim 21 further comprising a spherical bearing for facilitating the pin pivotably engaging at least one of the first and second components.

24. The mechanism according to claim 20 further comprising a switch engaging member fixably attached to the first component.

25. The mechanism according to claim 24 wherein the switch engaging member includes a radial face.

26. A method of actuating a switch and transmitting motion to a system component comprising the steps of:
moving a first component along a first path;
communicating motion from the first component to the switch; and
communicating motion from the first component to the system component, wherein motion transverse to the first path is generally isolated from the switch.

27. The method of claim 26 wherein the system component is a vehicle brake system component.

28. The method of claim 26 wherein communicating motion from the first component to the switch comprises:
pivoting a pin relative to the first component; and
changing the relative position between the switch and a switch engaging member in response to pivoting the pin such that the switch engaging member actuates the switch using motion generally along the first path.

29. The method of claim 28 wherein the switch engaging member is attached to the first component.

30. The method of claim 28 wherein actuating the switch includes depressing a switch plunger.

* * * * *